United States Patent [19]

Chevrollier

[11] Patent Number: 4,584,890

[45] Date of Patent: Apr. 29, 1986

[54] DEVICE FOR ROTATING, AT WILL AND STEP BY STEP, A SHAFT DRIVEN FROM A DRIVING SHAFT

[75] Inventor: Guy Chevrollier, Frepillon, France

[73] Assignee: Societe d'Applications Generales, Paris, France

[21] Appl. No.: 545,846

[22] Filed: Oct. 27, 1983

[30] Foreign Application Priority Data

Nov. 9, 1982 [FR] France .................. 82 18798

[51] Int. Cl.⁴ .................. F16D 27/06; F16D 41/04
[52] U.S. Cl. .................. 74/113; 74/116; 74/125.5; 192/0.03; 192/48.2; 192/48.4; 226/152; 226/156
[58] Field of Search .......... 74/113, 116, 118, 125.5, 74/157; 192/0.03, 48.2, 48.4, 48.6, 48.92, 84 B, 51, 84 P; 226/152, 156

[56] References Cited

U.S. PATENT DOCUMENTS

| | | | |
|---|---|---|---|
| 1,900,787 | 3/1933 | Baugnee | 192/48.92 X |
| 2,230,293 | 2/1941 | Harris | 192/48.4 X |
| 2,462,393 | 2/1949 | Haynes | 192/51 X |
| 2,685,082 | 7/1954 | Beman et al. | 192/84 P |
| 2,699,683 | 1/1955 | Castner | 192/48.92 X |
| 2,859,362 | 11/1958 | Niblick | 192/48.92 X |
| 3,258,092 | 6/1966 | Schiebeler | 192/84 P |
| 3,409,107 | 11/1968 | Shill | 192/51 X |

FOREIGN PATENT DOCUMENTS 1155297 10/1963 Fed. Rep. of Germany ........ 74/157

Primary Examiner—Martin P. Schwadron
Assistant Examiner—Stephen M. Hepperle
Attorney, Agent, or Firm—Larson and Taylor

[57] ABSTRACT

A device for rotating at will, step by step, a shaft (2) driven from a drive shaft to which is imparted a continuous uninterrupted rotational movement in an invariable direction, comprising means for transforming the continuous rotational movement of the drive shaft into an alternating rotational movement of an intermediate rotary member (7), disengageable coupling means (9 to 13) and a free wheel device (17), interposed between the intermediate rotary member (7) and the drive shaft (2), and means for controlling the disengageable coupling means adapted so that the driven shaft is locked in rotation with the intermediate rotary member only when this latter effects a rotational movement in the appropriate direction.

11 Claims, 3 Drawing Figures

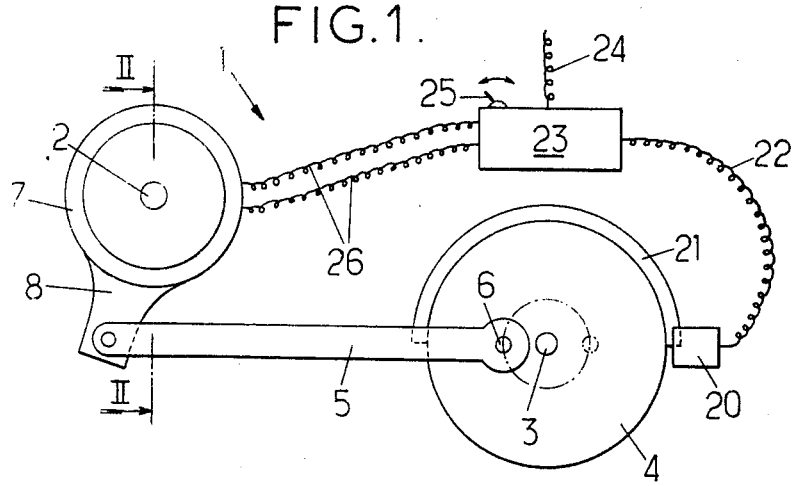
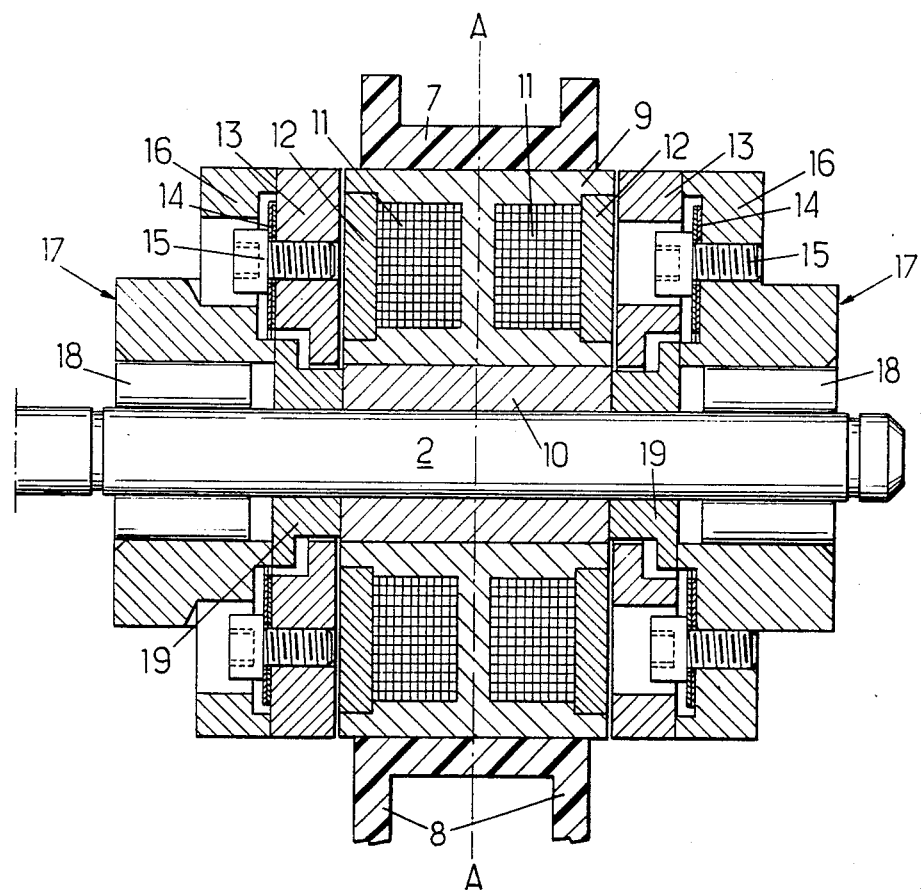

DEVICE FOR ROTATING, AT WILL AND STEP BY STEP, A SHAFT DRIVEN FROM A DRIVING SHAFT

The present invention relates to a device for rotating, at will and step by step, a shaft driven from a driving shaft to which is imparted a continuous and uninterrupted rotational movement in an invariable direction.

For a better understanding, an example of such a movement transformation device is met with for causing the tape to advance in tape perforating machines for teletypewriters: the electric drive motor is set in rotation as soon as the machine is started up and rotates at a constant speed in an invariable direction, whereas the shaft driving the tape must rotate step by step (the perforation taking place with the tape stopped), only when the tape is being perforated.

Furthermore, for some applications, it may be desirable to be able to rotate the driven shaft in one direction or in the other, from the driving shaft rotating in an invariable direction: this is precisely the case in the example chosen of tape perforating machines for teletypewriters, since it must be possible to bring the tape back, for example for correcting a wrong perforation.

For providing a mechanical drive of the kind considered, a number of devices are known which each present disadvantages.

Ratchet wheel devices are very noisy, do not allow very high rotational speeds and offer only a restricted predetermined number of locking positions.

Step by step electric motors offer, it is true, greater possibilities but their cost is too high.

The invention has then essentially as aim a drive device of the kind considered which does not present the disadvantages of known devices and which, generally, answers better the different requirements of practice than these known devices, particularly in so far as silent operation, rotational speed and the number of locking positions are concerned, while remaining of simple technological design, taking up little space and being of a relatively modest cost.

To these ends, the drive device in accordance with the invention is characterized in that it comprises:

means for transforming the continuous rotational movement of the drive shaft into an alternating rotational movement of an intermediate rotary member, disengageable coupling means and a free wheel device, interposed between the intermediate rotary member and the driven shaft, and means for controlling the disengageable coupling means adapted so that the driven shaft is locked in rotation with the intermediate rotary member only when this latter effects a rotational movement in the appropriate direction.

Preferably, the free wheel device comprises at least one roller free wheel.

In a preferred embodiment, the free wheel device is mounted coaxially on the driven shaft and the disengageable coupling means are interposed between the free wheel device and the intermediate rotary member.

Advantageously, the disengageable coupling means comprise an electromagnetic clutch comprising annular body and coil, coaxial with the driven shaft and locked in rotation with the intermediate rotary member, and a friction plate, locked in rotation with the free wheel device and coaxial with the driven shaft, adapted for sliding axially so as to cooperate with the annular body when the coil is energized under the action of said control means, return means being provided for bringing the friction plate back to its disengaged position when the coil is not energized; in this case, the return means may comprise a spring formed by a resiliently deformable disk coaxial with the driven shaft and bearing, on the one hand, on the free wheel device and, on the other, on the friction plate.

For improved operation, it is desirable for a second friction plate, coaxial with the driven shaft, to be integral with the body and situated opposite the first friction plate.

It is possible to construct, in accordance with the invention, a device for rotating at will, step by step and selectively in one direction or in the other, a shaft driven from a drive shaft to which is imparted a continuous and uninterrupted rotational movement in an invariable direction: such a device is formed by the association of two devices for driving step by step in a single direction, in which the free wheel devices are mounted so as to act in opposition to each other.

Whatever the embodiment contemplated, it is advantageous for the means transforming the continuous rotational movement of the drive shaft into an alternating rotational movement of the intermediate rotary member to comprise a connecting rod-crank assembly coupled on one side to the intermediate rotary member and on the other side to the drive shaft.

Advantageously, the means for controlling the disengageable coupling means comprise means for detecting a magnitude representative of the angular position of the intermediate rotary member; more particularly, the detection means may comprise a wheel fixed for rotation on the drive shaft, at least one mark carried by said wheel for identifying the angular positions of the intermediate rotary member and an optical system for detecting said marks.

With the arrangements in accordance with the invention, it is then possible to form devices for rotating, at will and step by step either in one direction or in both directions, a shaft driven from a drive shaft permanently rotating at constant speed in a given direction, which device may operate at high speed, with a reduced noise level and with high accuracy as regards the angular position for engaging or disengaging the driven shaft. Furthermore, the component members are currently commercially available and the structure remains simple; the result is that such a step by step drive device remains inexpensive not only as regards its manufacture but also it maintenance and that its reliability is high.

The invention will be better understood from reading the following description of a preferred embodiment, given solely by way of illustrative example. In this description, reference is made to the accompanying drawings in which:

FIG. 1 is a schematical side view of a step by step drive device in accordance with the invention;

FIG. 2 is an enlarged section through line II—II of FIG. 1; and

Figure 3:
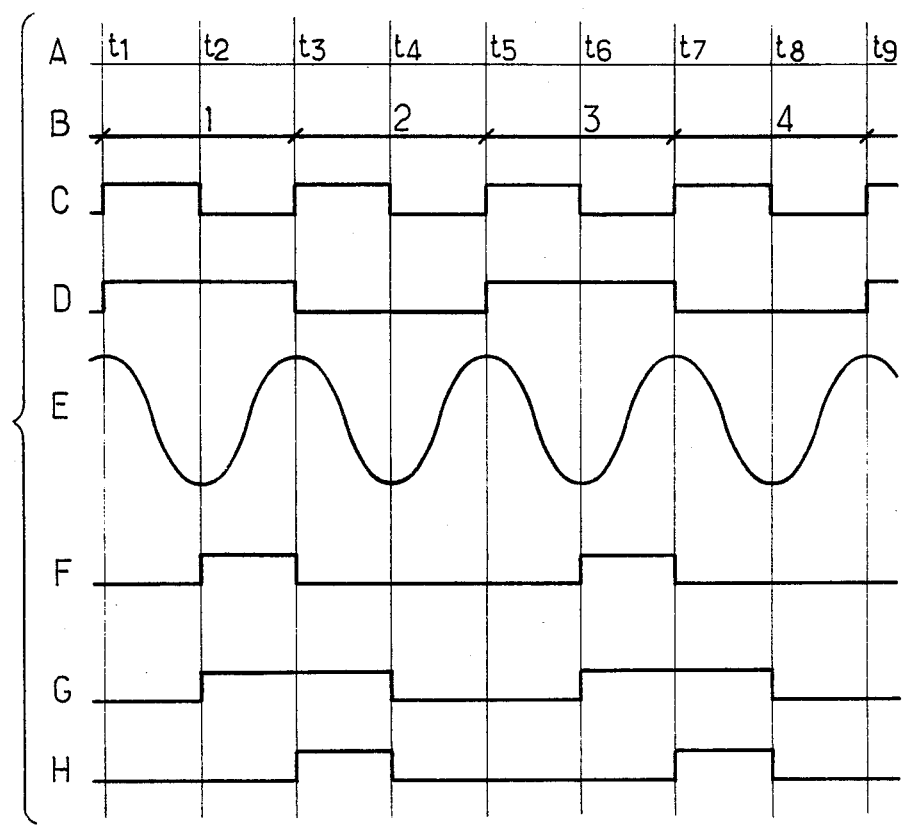
FIG. 3 shows different graphs illustrating the operation of the device of FIGS. 1 and 2.

In FIG. 1, the numerical reference 1 designates generally a device for rotating, at will and step by step selectively in one direction or in the other, a shaft 2 driven from a drive shaft 3 to which is imparted a continuous rotational movement at constant speed and in an invariable direction.

More precisely, drive shaft 3 is rotated from a drive means (not shown) such as an electric motor which is set in rotation as soon as the machine is switched on in which the drive device of the invention is included.

The drive device is formed essentially of three main parts providing respectively three functions, namely:

a first constituent part providing the transformation of the continuous rotational movement at constant speed and in an invariable direction of the drive shaft 3 into a continuous alternating rotational movement of an intermediate piece, a second constituent part providing transformation of the continuous alternating rotational movement of said intermediate piece into a step by step rotational movement, at will and in the desired direction, of the driven shaft 2, and a third constituent part providing control of the second part so as to obtain the desired movement.

Referring more specifically to FIG. 1, the first constituent part of device 1 comprises a wheel 4 fixed for rotation on the drive shaft 3, a connecting rod 5, one end of which is fixed for rotation to a crank pin 6 integral, in an off-centered position, with wheel 4, and an intermediate rotary piece 7 coaxial with the driven shaft 2 and adapted to rotate thereabout, this piece 7 supporting the other end of connecting rod 5 in an articulated way and in an off-centered position (for example on a radial lug 8).

With the connecting rod-crank system formed by wheel 4 and connecting rod 5, the uniform rotational movement of the drive shaft 3 is transformed into an alternating rotational movement of the intermediate rotary piece 7.

Referring now more specifically to FIG. 2, the second constituent part of device 1 comprises a double electromagnetic actuator comprising an annular magnetic body 9 integral with the intermediate piece 7 and centered for rotation on the driven shaft 2 by means of a bearing 10. This body 9 contains two annular coils 11. Furthermore, so as to increase the operating efficiency, two annular friction shoes 12 are fixed respectively to the lateral faces of the electromagnetic actuator.

Opposite each of the lateral faces of the electromagnetic actuator is disposed an annular friction shoe 13 locked in rotation, through an axially acting return spring 14 to which it is fixed by bolts 15, with the body 16 of a free wheel 17 with rollers 18 carried by the driven shaft 2. A spacer ring 19, interposed between the body 16 of the free wheel 17 and bearing 10, ensures positioning of the free wheel-friction shoe 13 assembly so that there is formed, in the rest position of the system, a gap between the two facing friction shoes 13 and 12.

It may be noted that the assembly of members mounted on the driven shaft 2 presents a plane of symmetry AA perpendicular to the driven shaft 2.

Finally, the third constituent part of device 1 comprises the control for the electromagnetic clutch formed by members 9,11,12,13. As shown in FIG. 1, this control comprises a detector 20 detecting the angular position of wheel 4, this detector being formed for example by a photoemissive diode and a phototransistor (not shown) disposed face to face. A shutter 21, carried by wheel 4, is disposed so that, at each revolution of the wheel, the detector 20 is triggered in an appropriate way. In the example shown, the shutter 21 is a strip extending over half a turn of wheel 4 at the periphery thereof and adapted to engage in the gap extending between the diode and the phototransistor so as to cut off the light beam.

Detector 20 is connected, at 22, to a control block 23 further receiving the control information for starting up the driven shaft 2 (line 24) and selecting the direction of rotation of the driven shaft 2 (for example switch 25). The control block 23 supplies, depending on the different information which is fed thereto, suitable energizing signals to one of the two coils 11 of the electromagnetic clutch, through one or other of the two lines 26 which connect it respectively to said coils.

The control block 23 may further deliver energizing signals with different characteristics so as to obtain several rotational speeds of the driven shaft 2.

The control block 23 may advantageously use pulsed electronic means. Construction thereof is within the scope of a man skilled in the art and will not be described here.

Referring to FIG. 3, the operation of the device of the invention will now be described.

It will be first of all assumed that the driven shaft rotates in any direction which, for clarity of explanation, will be named hereafter forward direction.

In FIG. 3, graph A shows the timing scale, times $t_1$, $t_2$ etc defining the successive time intervals corresponding to half a rotation of the drive shaft 3.

Graph B symbolizes the rotation of the drive shaft 3, numbers 1,2,3 etc. representing the number of revolutions effected from time $t_1$.

Graph C represents the signal delivered by detector 20, as a function of the passing of shutter 21. This signal is processed by the control block 23 so that the successive energization and de-energization of the appropriate coil 11 are controlled only by the rising edges of the signal coming from detector 20. The coil is then energized for the time intervals $t_1t_3, t_5t_7$ etc. and de-energized during the time intervals $t_3t_5, t_7t_9$, etc.

Graph D represents the signal for controlling the coil, the high state of the signal corresponding to the engaged state of the electromagnetic clutch.

Graph E represents the operation of the intermediate rotary piece driven with an alternating rotational motion.

Graph F represents the state of the corresponding free wheel 17, the low level of the graph representing its free wheel operation and the high level its coupled operation. Since the coupled operation can only take place in a single direction of movement of the intermediate rotary piece 7 (descending parts of graph E in the example considered) and this only when the clutch is in the engaged position, it can be seen, by comparing graphs D and E, that this coupled operation can only occur during time intervals $t_2t_3, t_6t_7$, etc.

If it is now desired to drive the driven shaft 2 in a direction opposite the preceding direction, or in the rearward direction, switch 25 is switched over so that the control block now takes into consideration the trailing edges or falling edges of the signal C supplied by detector 20.

Graph G represents the signal delivered by the control block 23 for now energizing the other coil 11.

It will be noted that, in this operational mode in the reverse direction, the free wheel 17 associated with the energized clutch acts in phase opposition to the free wheel associated with operation in the forward direction: in other words, it is locked during the time intervals corresponding to the falling parts of graph E.

Thus, the driven shaft is driven step by step in the reverse direction during the time intervals $t_3t_4, t_7t_8$, etc., as shown by graph H.

The step by step drive device which has just been described proves particularly advantageous to the extent that it overcomes certain disadvantages presented by clutches, and particularly electromagnetic clutches.

In fact, in large scale manufacture, electromagnetic clutches have a great dispersion in time of engagement and disengagement which results in a corresponding inaccuracy in driving the driven shaft.

The association, in accordance with the invention, of a clutch, more especially an electromagnetic clutch, having an imprecise response time with a free wheel device, more especially a roller free wheel device with an extremely short response time, gives very good results: in fact, because the free wheel only changes state after a half revolution effected by the driving shaft 3 from energization or de-energization of the coil 11, the effective engagement or disengagement of the clutch may take place at any moment during this half revolution, either between the times $t_1t_2, t_5t_6$, etc. for engagement or between times $t_3t_4, t_7t_8$, etc. for disengagement.

In addition, it will be noted that the operation, and more especially the control time, of the device of the invention is independent of the speed of rotation of the driving and driven shafts. The result is great operational reliability at all speeds.

Furthermore, the step by step drive device in accordance with the invention presents a number of other advantages: simplicity of construction and maintenance resulting in low purchase and maintenance costs, space saving, constituent parts available commercially and a low operating noise in the case where a roller free wheel device is used.

As is evident and as it follows moreover already from what has gone before, the invention is in no wise limited to those of its modes of application and embodiments which have been more especially considered; it embraces, on the contrary all variations thereof.

In particular, although the previously described embodiment refers to an advance by one step of the driven shaft for two revolutions of the drive shaft, it is however possible to adapt the control means so that each advance step of the driven shaft is obtained for a single revolution of the driving shaft: it is sufficient for this for the control block 23 to take into account all the rising edges (and not just one rising edge out of two) of the signal C delivered by detector 20 as signal controlling energization of the electromagnetic clutch. Such a modification of operation is readily obtained, by adequate programming, when the control block 23 is a microprocessor management block; in this case, the programming may for example be such that the reception of an isolated perforation order causes the driven shaft to advance by one step for two revolutions of the drive shaft, whereas the reception of a train of perforation orders (continuous perforation of the strip) causes the driven shaft to advance by one step for a single revolution of the drive shaft.

Of course, in the case considered, lower driving speeds than those indicated (i.e. advance by the driven shaft by one step for n (wherein $n \geq 2$) revolutions of the driving shaft) may be readily obtained if so desired, by only taking into consideration certain rising edges of the signal C, for example by means of adequate programming of the management block.

I claim:

1. A device for rotating, at will and step by step, a shaft driven from a driving shaft to which is imparted a continuous and uninterrupted rotational movement in an unvariable direction, said device comprising:
    an intermediate rotary member,
    means for transforming the continous rotational movement of the driving shaft into an alternating rotational movement of said intermediate rotary member,
    declutchable coupling means and a free wheel device interposed between the intermediate rotary member and the driven shaft,
    and control means for controlling the declutchable coupling means such that the driven shaft is coupled to the intermediate rotary member for rotation therewith only when the intermediate rotary member effects a rotational movement in the appropriate direction, said free wheel device comprising at least one roller free wheel.

2. The device according to claim 1, wherein the free wheel device is mounted coaxially on the driven shaft and wherein the coupling means is are interposed between the free wheel device and the intermediate rotary member.

3. The device according to claim 2, wherein the disengageable coupling means comprise an electromagnetic clutch comprising an annular body and a coil, coaxial with the driven shaft and locked in rotation with the intermediate rotary member, and a friction plate, locked in rotation with the free wheel device and coaxial with the driven shaft, adapted for axial sliding so as to cooperate with the annular body when the coil is energized under the action of said control means, return means being provided for bringing the friction plate back to its uncoupled position when the coil is not energized.

4. A device for rotating, at will and step by step, a shaft driven from a driving shaft to which is imparted a continous and uninterrupted rotational movement in an invariable direction, said device comprising:
    an intermediate rotary member,
    means for transforming the continous rotational movement of the driving shaft into an alternating rotational movement of said intermediate rotary member,
    a free wheel device coaxially mounted on the driven shaft,
    electromagnetic clutch means comprising an annular body and a coil disposed coaxially with respect to the driven shaft and rotatable with the intermediate rotary member, and further including friction plate means rotatable with the free wheel device and disposed coaxially with respect to the driven shaft so as to slide axially thereon, responsive to energization and de-energization of said coil, between a coupling position wherein said friction plate cooperates with the annular body of the electromagnetic clutch means when the coil is energized and an uncoupled position when the coil is de-energized,
    return means connected to the friction plate means for returning said friction plate means to the uncoupled position thereof when the coil is de-energized, and
    control means connected to the coil of said electromagnetic clutch means for controlling energization the coil such that the driven shaft is coupled to the intermediate rotary member for rotation therewith only when the intermediate rotary member rotates in the appropriate direction.

5. The device according to claim 4, wherein the free wheel device comprises at least one roller free wheel.

6. The device according to claim 4, characterized in that the return means comprise a spring formed by a resiliently deformable disk coaxial with the driven shaft and bearing, on the one hand, on the free wheel device and, on the other hand, on the friction plate.

7. The device according to claim 4, wherein a second friction plate, coaxial with the driven shaft, is integral with the body and situated opposite the first friction plate.

8. A device for rotating at will, step by step and selectively in one direction or the other, a shaft driven from a driving shaft to which a continuous and uninterrupted rotational movement is imparted in an invariable direction, said device comprising an association of two devices according to claim 4, the free wheel devices being mounted so as to act in opposition to each other.

9. The device according to claim 4, wherein the means for transforming the continuous rotational movement of the drive shaft into an alternating rotational movement of the intermediate rotary member comprises a connecting rod-crank assembly coupled on the one side to the intermediate rotary member and on the other to the drive shaft.

10. The device according to claim 4, wherein the means for controlling the declutchable coupling means comprise detection means for detecting a magnitude representative of the angular position of the intermediate rotary member.

11. The device according to claim 10, wherein the detection means comprises a wheel fixed for rotation on the drive shaft, and at least one mark carried by said wheel for identifying the angular positions of the intermediate rotary member and a system for the optical detection of said marks.

* * * * *